(12) United States Patent
Lee et al.

(10) Patent No.: US 7,280,719 B2
(45) Date of Patent: Oct. 9, 2007

(54) WIDEBAND OPTICAL MODULE AND PON USING THE SAME

(75) Inventors: Jae-Hoon Lee, Seoul (KR); Sung-Bum Park, Suwon-si (KR); Yun-Je Oh, Yongin-si (KR); Seong-Taek Hwang, Pyeongtaek-si (KR); Hyun-Soo Kim, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 17 days.

(21) Appl. No.: 11/143,238

(22) Filed: Jun. 2, 2005

(65) Prior Publication Data
US 2006/0029393 A1   Feb. 9, 2006

(30) Foreign Application Priority Data
Aug. 9, 2004   (KR) ...................... 10-2004-0062546

(51) Int. Cl.
*G02B 6/28* (2006.01)
(52) U.S. Cl. ......................................... 385/24; 398/71
(58) Field of Classification Search ................. 385/24; 398/71
See application file for complete search history.

(56) References Cited

U.S. PATENT DOCUMENTS

| | | | | |
|---|---|---|---|---|
| 4,831,616 A * | 5/1989 | Huber | ......................... | 398/100 |
| 5,633,741 A * | 5/1997 | Giles | ......................... | 398/79 |
| 5,742,416 A * | 4/1998 | Mizrahi | ......................... | 398/92 |
| 5,812,306 A * | 9/1998 | Mizrahi | ................... | 359/341.2 |
| 6,480,312 B1 * | 11/2002 | Okuno et al. | ................ | 398/158 |
| 6,580,548 B2 * | 6/2003 | Islam | ......................... | 359/334 |
| 6,888,671 B2 * | 5/2005 | Joo et al. | ................. | 359/341.2 |
| 6,894,830 B2 * | 5/2005 | Lee et al. | ................. | 359/341.2 |
| 6,941,074 B2 * | 9/2005 | Nakamura et al. | ............ | 398/92 |
| 7,171,123 B2 * | 1/2007 | Lee et al. | ..................... | 398/82 |
| 2001/0022875 A1 * | 9/2001 | Asahi | .......................... | 385/17 |
| 2002/0067526 A1 * | 6/2002 | Park et al. | ................... | 359/127 |

* cited by examiner

*Primary Examiner*—Ellen E. Kim
(74) *Attorney, Agent, or Firm*—Cha & Reiter, L.L.C.

(57) ABSTRACT

A wideband optical module includes a downward wideband light source for generating downward light, an upward wideband light source for generating upward light, a first circulator including a first to a third port for outputting multiplexed downward optical signals to the second port and for outputting multiplexed upward optical signals to the first port, a second circulator including a first to a third port for outputting multiplexed upward optical signals to the second port and for outputting multiplexed downward optical signals to the first port, a first optical coupler connected to the third port of the first circulator and the second port of the second circulator for outputting the downward light to the third port of the first circulator, and a second optical coupler connected to the second port of the first circulator and the third port of the second circulator for outputting the upward light to the third port of the second circulator.

9 Claims, 5 Drawing Sheets

WIDEBAND OPTICAL MODULE AND PON USING THE SAME

CLAIM OF PRIORITY

This application claims priority to an application entitled "Wideband Optical Module and PON using the same," filed in the Korean Intellectual Property Office on Aug. 9, 2004 and assigned Serial No. 2004-62546, the contents of which are incorporated herein by reference.

BACKGROUND OF THE INVENTION

1. Field of the Invention

The present invention relates to a wavelength division multiplexed (WDM) system, and more particularly to a WDM system including a mode-locked light source.

2. Description of the Related Art

A WDM system assigns a specific wavelength to each subscriber to facilitate an ultra high-speed wideband communication service. The WDM scheme is advantageous in that it can easily increase the channel capacity and can ensure a high level of security for a user as it assigns a specific wavelength to each subscriber. In addition, a separate wavelength is assigned to a new subscriber, so that new subscribers can be easily accommodated in a communication network.

Recently, a mode-locked light source for generating mode-locked optical signals using incoherent light has been used in the aforementioned WDM communication system. The mode-locked light source includes a Fabry-Perot laser for generating mode-locked optical signals, a wideband light source for generating a light over a wide wavelength range for inducing the mode-lock of the Fabry-Perot laser, etc. The wideband light source may use an Erbium doped optical fiber, a semiconductor optical amplifier, etc. The light, which may be spontaneous emission light, is used for mode-locking a corresponding Fabry-Perot laser after being divided according to each wavelength.

A WDM communication system using the mode-locked light source as described above includes a Passive Optical Network (PON). The PON provides optical signals to multiple subscribers through a single line. The PON includes a central office for providing mode-locked downward optical signals, a plurality of subscriber sides for receiving corresponding downward optical signals and generating mode-locked upward optical signals, and a remote node for relaying the subscriber ends to the central office. The central office is connected to the remote node through a single optical fiber.

The remote node includes a multiplexer/demultiplexer so as to multiplex the upward optical signals received from the subscriber side and output the multiplexed upward optical signal to the central office. The central office demultiplexes multiplexed downward optical signals and outputs the demultiplexed downward optical signals to the subscriber sides.

The central office includes a multiplexer/demultiplexer, downward wideband light sources for generating the mode-locked downward optical signals, photodetectors for detecting corresponding demultiplexed upward optical signals, a controller for monitoring and controlling wavelength change of upward optical signals and downward optical signals, monitoring means for monitoring the wavelength change of the upward optical signals and the downward optical signals and normality or abnormality of a network, a optical module for generating lights over a wide wavelength range, etc.

The optical module further includes a first light source for generating a downward light over a wide wavelength range for mode-locking the downward wideband light sources, a second light source for generating an upward light for mode-locking each of the subscriber sides, and a first optical coupler for inputting/outputting multiplexed upward and downward optical signals through the optical fiber and connecting the first light source with the a second light source through the optical fiber.

The monitoring means monitor whether the line of the PON functions properly. Further, the monitoring means monitor downward or upward optical signals and transmit the wavelength change in the downward optical signals or the upward optical signals to the controller. The controller compares the wavelengths of the downward optical signals or the upward optical signals, which are received from the monitoring means, with predetermined input values. Then, the controller controls the PON according to the wavelength change obtained from the comparison result.

However, the conventional WDM PON including the mode-locked light source inputs/outputs the light over the wide wavelength range and the mode-locked optical signals through the optical couplers which tend to cause unnecessary loss in the intensity of light.

SUMMARY OF THE INVENTION

Accordingly, the present invention has been made to solve the above-mentioned problems occurring in the prior art and provides additional advantages, by providing a wideband optical module capable of minimizing light loss over a wide wavelength range when inducing a mode-lock.

In accordance with one aspect of the present invention, there is provided a wideband optical module located on a communication optical line which includes: a downward wideband light source for generating a downward light over a wide wavelength range; an upward wideband light source for generating an upward light over a wide wavelength range; a first circulator including a first to a third port for outputting multiplexed downward optical signals, which are inputted to the first port connected to the optical line, to the second port, and for outputting multiplexed upward optical signals, which are inputted to the third port, to the first port; a second circulator including a first to a third port for outputting multiplexed upward optical signals, which are inputted to the first port coupled to the optical line, to the second port, and for outputting multiplexed downward optical signals, which are inputted to the third port, to the first port; a first optical coupler coupled to the third port of the first circulator and the second port of the second circulator for outputting the downward light, which is inputted from the downward wideband light source, to the third port of the first circulator; and a second optical coupler coupled to the second port of the first circulator and the third port of the second circulator, for outputting the upward light, which is inputted from the upward wideband light source, to the third port of the second circulator.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments according to the present invention will be described with reference to the accompanying drawings. For the purposes of clarity and simplicity, a detailed description of known functions and configuration incorporated herein will be omitted as it may make the subject matter of the present invention unclear.

Figure 1:
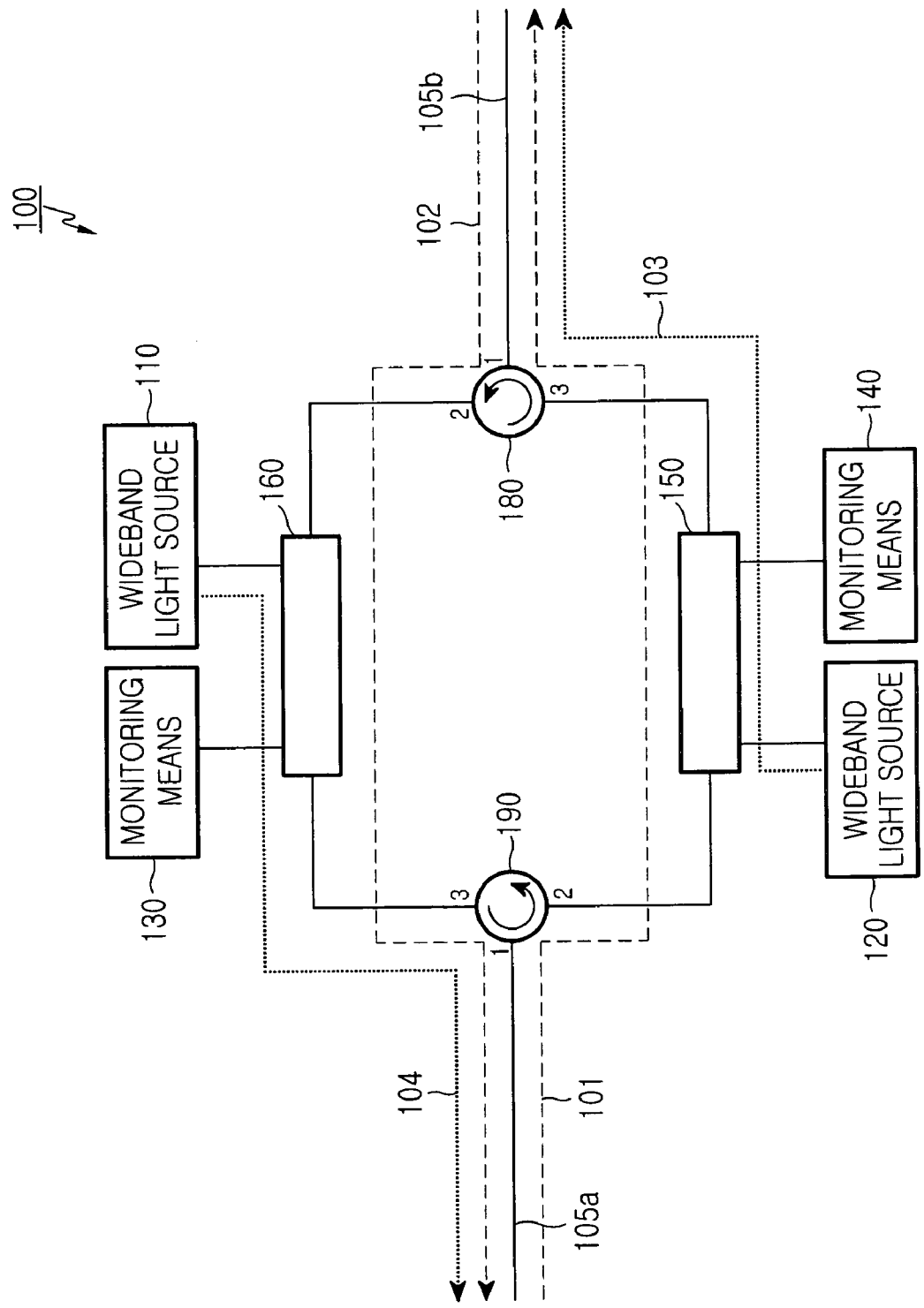
FIG. 1 is a block diagram showing the construction of a wideband optical module according to a first embodiment of the present invention.

FIG. 1 is a block diagram showing the construction of a wideband optical module according to a first embodiment of the present invention. As shown, the wideband optical module 100 includes a downward wideband light source 110 for generating a downward light 104 over a wide wavelength range, an upward wideband light source 120 for generating an upward light 103 over a wide wavelength range, a first circulator 190, a second circulator 180, and a first and a second optical coupler 160 and 150. The wideband optical module 100 is located along an optical line 105 of a WDM PON so as to input/output multiplexed downward or upward optical signals 101 and 102.

The first circulator 190 includes a first to a third port, outputs the multiplexed downward optical signals 101, which are inputted to the first port connected to the optical line 105a, to the second port, and outputs the multiplexed upward optical signals 102, which are inputted to the third port, to the first port. Similarly, the second circulator 180 has a first to a third port, outputs the multiplexed upward optical signals 102, which are inputted to the first port connected to the optical line 105b, to the second port, and outputs the multiplexed downward optical signals 101, which are inputted to the third port, to the first port.

The first optical coupler 160, connected to the third port of the first circulator 190 and the second port of the second circulator 180, outputs the downward light 104, which are inputted from the downward wideband light source 110, to the third port of the first circulator 190, and outputs the multiplexed upward optical signals 102, which are inputted through the second circulator 180, to the first circulator 190. Further, the first optical coupler 160 partially divides the upward optical signal or reflected and returned downward optical signal, and outputs the divided upward optical signal or downward optical signal to a first monitoring means 130 for inspecting the intensity of the upward optical signal.

The second optical coupler 150, connected to the second port of the first circulator 190 and the third port of the second circulator 180, outputs the upward light 103, which are inputted from the upward wideband light source 120, to the third port of the second circulator 180. Further, the second optical coupler 150 partially divides the multiplexed downward optical signals, which are inputted from the first circulator 190, to a second monitoring means 140.

The first monitoring means 130 monitors the upward optical signal or the reflected and returned downward optical signal, and the second monitoring means 140 monitors the downward optical signals.

The wideband optical module 100 respectively inputs/outputs the downward optical signals 101, which are inputted from the first circulator 190, and the upward optical signals 102, which are inputted through the second circulator 180, through divided paths, thereby minimizing the number of devices through which the downward and the upward optical signals 101 and 102 must pass.

Figure 2:
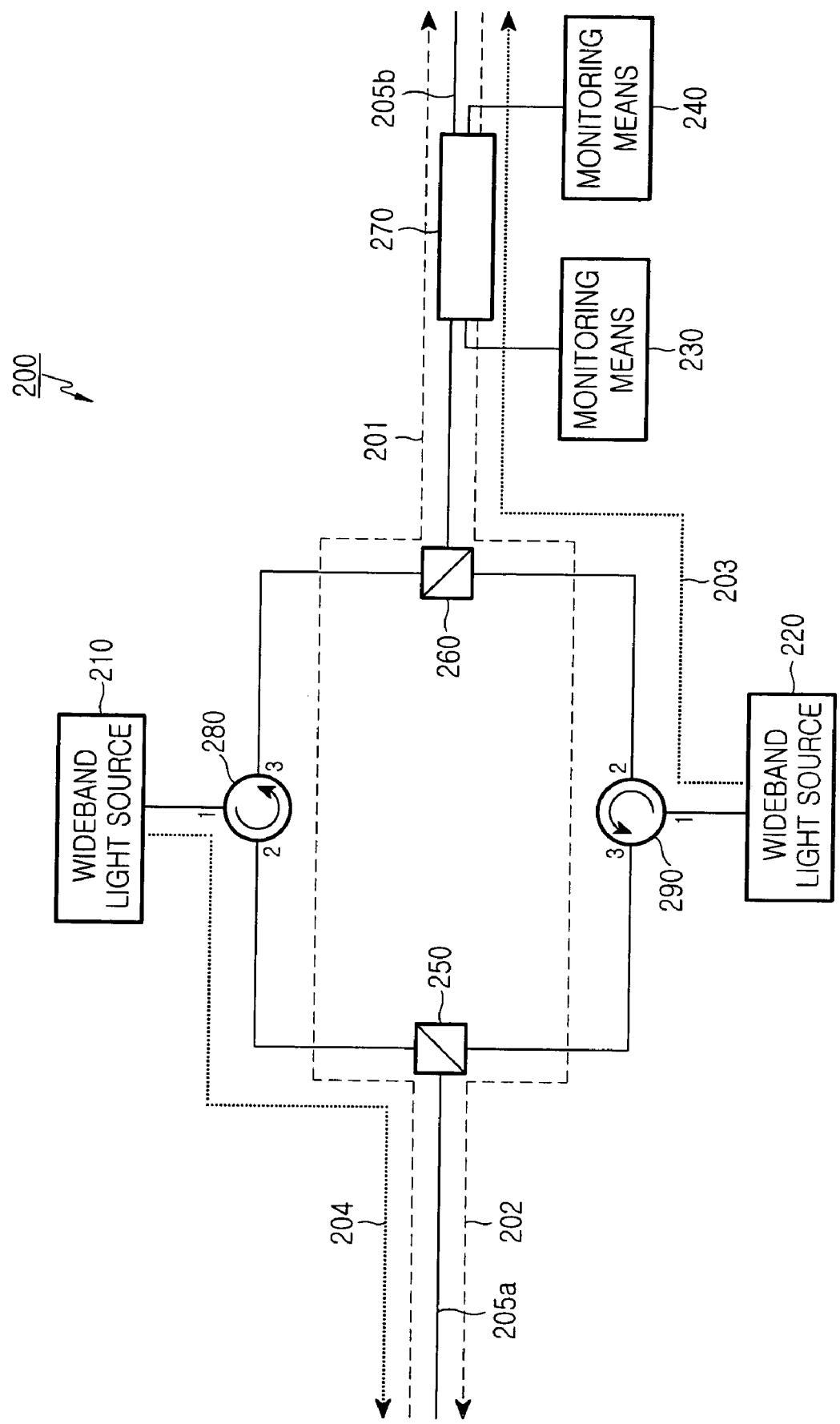
FIG. 2 is a block diagram showing the construction of a wideband optical module according to a second embodiment of the present invention.

FIG. 2 is a block diagram showing the construction of a wideband optical module according to a second embodiment of the present invention. As shown, the wideband optical module 200, which is located on communication optical lines 205a and 205b, includes a downward wideband light source 210 for generating a downward light 204 over a wide wavelength range, an upward wideband light source 220 for generating an upward light 203 over a wide wavelength range, a first and a second circulator 280 and 290, a first and a second wavelength selective couplers 250 and 260, and an optical coupler 270.

The first circulator 280 includes a first port connected to the downward wideband light source 210, a second port connected to the first selective coupler 250, and a third port connected to the second selective coupler 260. The first circulator 280 outputs the downward light 204, which is inputted from the downward wideband light source 210, to the second port, and outputs multiplexed downward optical signals 201 inputted to the second port to the third port.

The second circulator 290 includes a first port connected to the upward wideband light source 220, a third port connected to the first selective coupler 250, and a second port connected to the second selective coupler 260. The second circulator 290 outputs the upward light 203 inputted to the first port to the second port, and outputs multiplexed upward optical signals 202 inputted to the second port to the third port.

The first selective coupler 250 is disposed between the second port of the first circulator 280 and the third port of the second circulator 290, and is connected to the communication optical line 205a. The second selective coupler 260 is disposed between the third port of the first circulator 280 and the second port of the second circulator 290, and is connected to the communication optical line 205b.

The optical coupler 270 is disposed on the communication optical line 205b to be connected to the second selective coupler 260, partially divides the multiplexed upward and downward optical signals 201 and 202 inputted through the communication optical lines 205a and 205b, and outputs the divided optical signals to a first or a second monitoring means 230 or 240.

Figure 3:
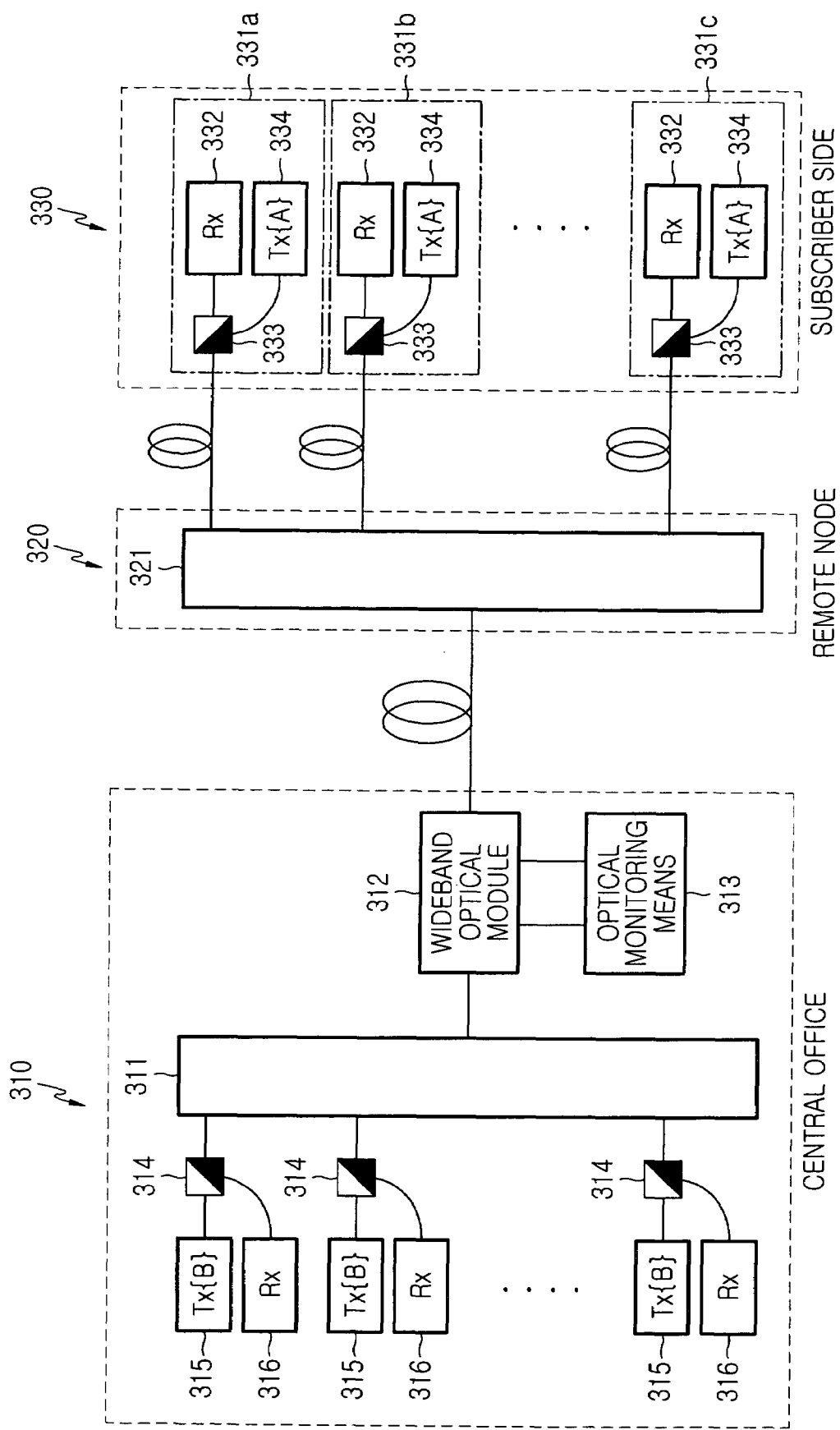
FIG. 3 is a block diagram showing a PON including a wideband optical module according to a third embodiment of the present invention.

FIG. 3 is a block diagram showing a PON including a wideband optical module according to a third embodiment of the present invention. As shown, the PON includes a central office 310 for generating multiplexed downward optical signals and detecting upward optical signals, a subscriber side including a plurality of subscribers 331a to 331c for detecting corresponding downward optical signals and generating mode-locked upward optical signals, and a remote node 320 for relaying the central office 310 to the subscriber side 330.

The central office 310 includes a plurality of downward light sources 315 for generating mode-locked downward optical signals, a plurality of photodetectors 316 for detecting corresponding upward optical signals generated from each subscriber, a wavelength selective couplers 314, a multiplexer/demultiplexer 311, a wideband optical module 312, an optical monitoring means 313, etc. The multiplexer/demultiplexer 311 multiplexes the downward optical signals, demultiplexes multiplexed upward optical signals inputted from the remote node 320, and outputs the demultiplexed upward optical signals to the corresponding photodetectors 316. Each of the wavelength selective couplers 314 outputs a corresponding downward optical signal to the multiplexer/demultiplexer 311, and outputs a corresponding upward optical signal, which is inputted from the multiplexer/demultiplexer 311, to the corresponding photodetector 316.

The multiplexer/demultiplexer 311 divides a downward light, which is generated in the wideband optical module 312, with a plurality of incoherent channels having wavelengths respectively, and outputs the divided light to the corresponding wavelength selective couplers 314. Each of the wavelength selective couplers 314 outputs the incoherent light to the corresponding downward light source 315.

The wideband optical module 312 generates an upward light for mode-locking each of the subscribers 331a to 331c at the subscriber side 330, generates a downward light for mode-locking each of the downward light sources 315 at the central office 310, partially divides the multiplexed downward and upward optical signals, and outputs the divided downward and upward optical signals to the optical monitoring means 313.

Figure 4:
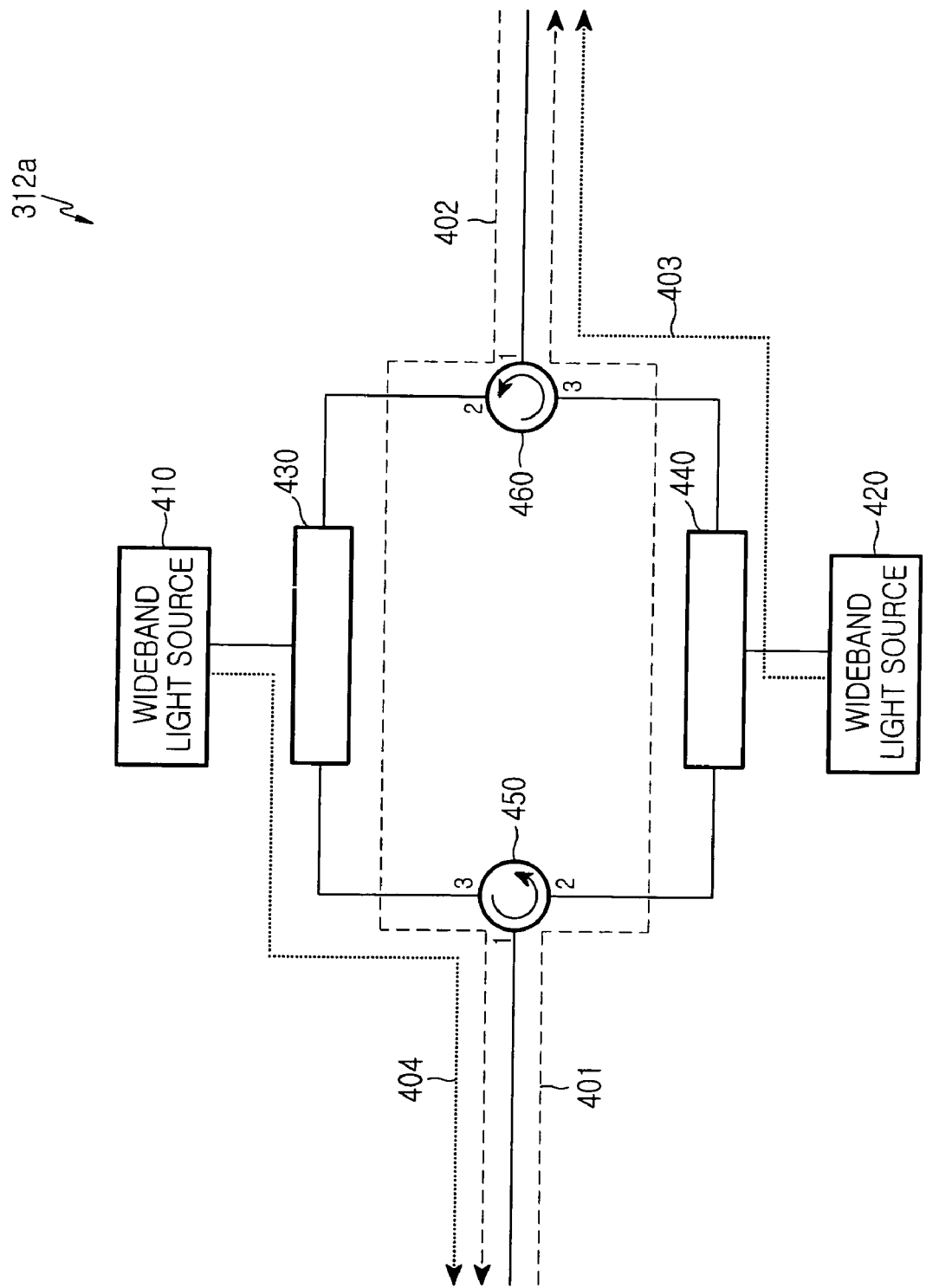
FIG. 4 is a block diagram showing the construction of the wideband optical module shown in FIG. 3.

FIG. 4 is a block diagram showing the detailed construction of the wideband optical module shown in FIG. 3 in accordance with one embodiment of the present invention. As shown, the wideband optical module 312a includes a downward light source 410, an upward light source 420, a first and a second optical coupler 430 and 440, and a first and a second circulator 450 and 460. Further, the wideband optical module 312a inputs/outputs downward and upward optical signals 401 and 402 through respective paths, thereby minimizing the optical loss. Furthermore, the wideband optical module 312a inputs/outputs the downward and upward optical signals 401 and 402 through respective paths, thereby minimizing the optical loss and providing the downward and upward optical signals 401 and 402 to the optical monitoring means 313.

Figure 5:
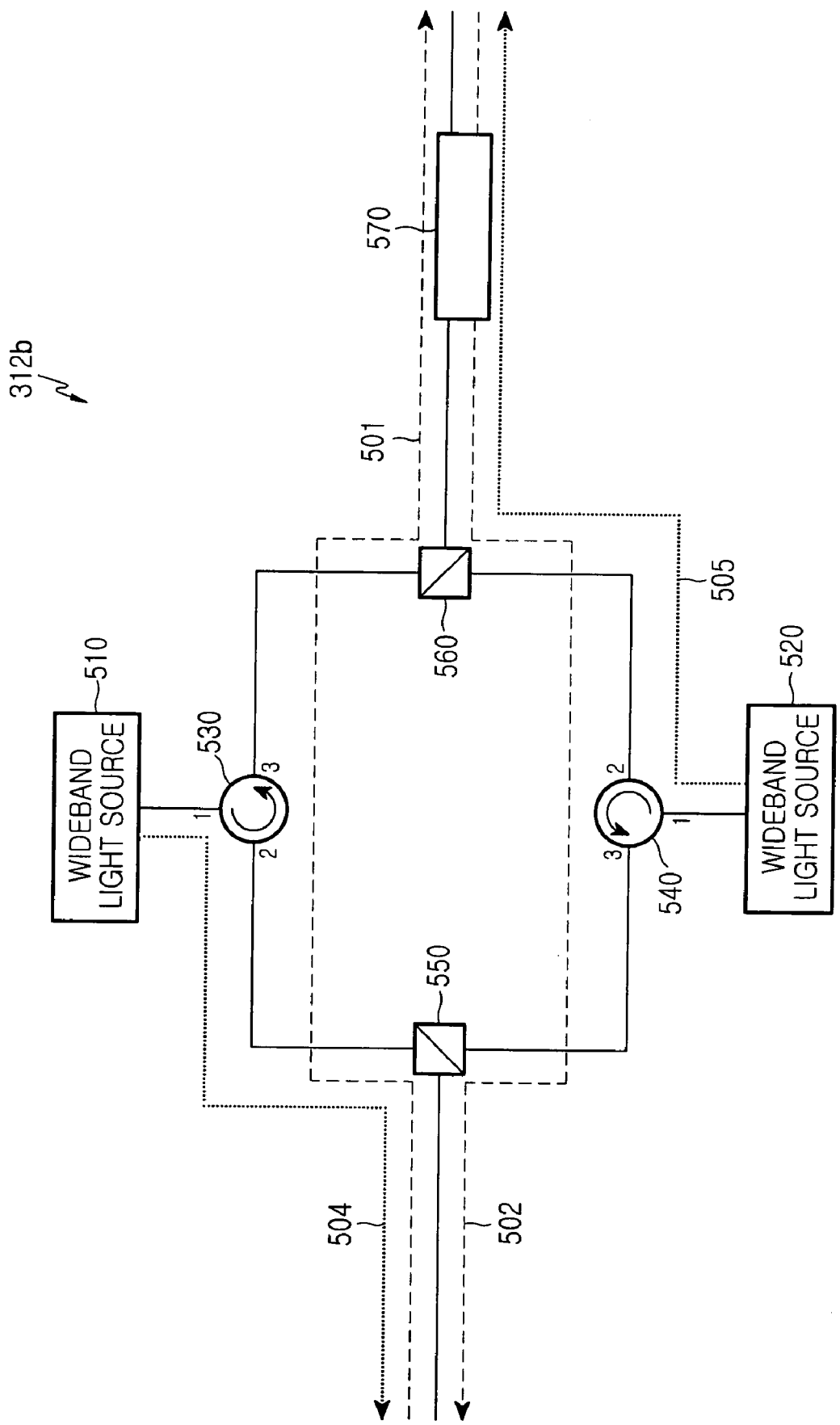
FIG. 5 is a block diagram showing the construction of the wideband optical module shown in FIG. 3.

FIG. 5 is a block diagram showing the detailed construction of the wideband optical module shown in FIG. 3 in accordance with another embodiment of the present invention. As shown, the wideband optical module 312b includes a downward wideband light source 510 for generating a downward light over a wide wavelength range, an upward wideband light source 520 for generating an upward light over a wide wavelength range, a first and a second circulator 530 and 540, a first and a second wavelength selective coupler 550 and 560, and an optical coupler 570. Since the detailed operation of the wideband optical module 312b shown in FIG. 5 is the same as that of the wideband optical module of the second embodiment of the present invention, a description for the operation of the wideband optical module 312b will be omitted to avoid redundancy.

The optical monitoring means 313 partially receives the downward and upward optical signals divided in the wideband optical module 312 or the reflected and returned downward optical signals, and monitors the downward and upward optical signals. Accordingly, the optical monitoring means 313 can control the shift or intensity of a wavelength according to whether a wavelength has been changed.

Referring back to FIG. 3, the remote node 320 includes a multiplexer/demultiplexer 321 demultiplexes multiplexed downward optical signals, which are inputted from the central office 310, and outputs the demultiplexed downward optical signals to the corresponding subscribers 331a to 331c. Further, the remote node 320 multiplexes upward optical signals, which are inputted from the subscriber side 330, and outputs the multiplexed upward optical signals to the central office 310. Furthermore, the remote node 320 divides an upward light, which is generated in the wideband optical module, with incoherent channels having wavelengths respectively, and outputs the divided light to the corresponding subscriber 331a, 331b or 331c. Each of the subscribers 331a to 331c generates upward optical signals mode-locked by a corresponding incoherent channel.

The subscriber side 330 includes the multiple subscribers 331a to 331c. Each of the subscribers 331a to 331c includes a downward photodetector 332 for detecting corresponding downward optical signals demultiplexed in the remote node 320, and an upward light source 334 for generating the upward optical signals mode-locked by the corresponding incoherent channel, which are divided in the remote node 320. Further, each of the subscribers 331a to 331c is linked to the remote node 320 through an optical fiber.

The present invention inputs/outputs multiplexed downward and upward optical signals through respective paths, thereby minimizing the intensity loss. That is, in order to monitor the intensities of the downward and upward optical signals, the number of optical devices such as an optical coupler required for coupling and dividing the downward and upward optical signals is minimized. Therefore, the intensity loss of the downward and upward optical signals can be minimized.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A wideband optical module provided in a communication optical line, comprising:
   a downward wideband light source configured to generate a downward light over a wide wavelength range;
   an upward wideband light source configured to generate an upward light over a wide wavelength range;
   a first circulator configured to output multiplexed downward optical signals and to output multiplexed upward optical signals;
   a second circulator configured to output the multiplexed upward optical signals and to output the multiplexed downward optical signals;
   at least one coupler being directly coupled to the first circulator and the second circulator and being configured to for partially dividing the multiplexed upward and downward optical signals inputted from the communication optical line;
   at least one monitor being directly coupled to the coupler and being configured to monitor an intensity of the multiplexed upward and downward optical signals based on a portion of the upward and downward optical signals divided by the optical coupler; and
   at least one selective coupler being disposed between the first circulator and the second circulator and being coupled to the communication optical line.

2. A wideband optical module provided along a communication optical line, comprising:
   a downward wideband light source configured to generate a downward light over a wide wavelength range;
   an upward wideband light source configured to generate an upward light over a wide wavelength range;
   a first circulator having a first to a third port, being configured to output multiplexed downward optical signals inputted from the first port to the second port and being configured to output multiplexed upward optical signals inputted from the third port to the first port;

a second circulator having a first to a third port, being configured to output multiplexed upward optical signals inputted from the first port to the second port, and being configured to output multiplexed downward optical signals inputted from the third port to the first port;

a first optical coupler being directly coupled to the third port of the first circulator, the second port of the second circulator, and the downward wideband light source, the first optical coupler being configured to output the downward light from the downward wideband light source to the third port of the first circulator; and a second optical coupler being directly coupled to the second port of the first circulator, the third port of the second circulator, and the upward wideband light source, the second optical coupler being configured to output the upward light from the upward wideband light source to the third port of the second circulator.

3. The wideband optical module in claim 2, wherein the first optical coupler is configured to output a portion of the multiplexed upward optical signals inputted from the first circulator.

4. The wideband optical module in claim 3, wherein the wideband optical module further comprises a first monitoring means for monitoring an intensity of the multiplexed upward optical signal based on the portion of the upward optical signal divided by the first optical coupler.

5. The wideband optical module in claim 2, wherein the second optical coupler is configured to output a portion of the multiplexed downward optical signals inputted from the second circulator.

6. The wideband optical module in claim 5, wherein the wideband optical module further comprises a second monitoring means for monitoring an intensity of the multiplexed downward optical signal based an the portion of the downward optical signal divided by the second optical coupler.

7. A wideband optical module provide along a communication optical line, comprising:

a downward wideband light source configured to generate a downward light over a wide wavelength range;

an upward wideband light source configured to generate an upward light over a wide wavelength range;

a first circulator having a first to a third port, being configured to output the downward light from the downward wideband light source inputted in the first port to the second port and being configured to output multiplexed downward optical signals inputted from the second port to the third port;

a second circulator having a first to a third port, being configured to output the upward light from the upward wideband light source inputted in the first port to the second port and being configured to output multiplexed upward optical signals inputted from the second port to the third port;

a first selective coupler being disposed between the second port of the first circulator and the third port of the second circulator and being coupled to the communication optical line;

a second selective coupler being disposed between the third port of to first circulator and the second port of the second circulator and being coupled to the communication optical line; and an optical coupler being disposed on the communication optical line being directly coupled to the second selective coupler arid a monitor, and being configured to partially divide the multiplexed upward and downward optical signals inputted from the communication optical line.

8. A passive optical network (PON) comprising:

a central office for generating mode-locked downward optical signals;

a plurality of subscribers for generating mode-locked upward optical signals; and a remote node for multiplexing the upward optical signals to output the multiplexed upward optical signals to the central office and for demultiplexing the downward optical signals to output the demultiplexed downward optical signals to a corresponding subscriber, wherein the central office comprises:

a plurality of downward light sources for generating mode-locked downward optical signals;

a plurality of upward photodetectors for detecting corresponding upward optical signals;

a multiplexer/demultiplexer for multiplexing the downward optical signals to output the multiplexed downward optical signals to the remote node and for demultiplexing the upward optical signals multiplexed in the remote node to output the demultiplexed upward optical signals to corresponding upward photodetectors;

a wideband optical module for generating a downward light for mode-locking the downward light sources, generating an upward light for mode-locking each of the subscribers, outputting the downward light to the multiplexer/demultiplexer through respective paths, outputting the upward light to the remote node, and dividing a portion of the downward and upward optical signals; and a monitoring means for monitoring the downward and upward optical signals based on the portion of the downward and upward optical signals divided by the wideband optical module.

9. The PON in claim 8, wherein the wideband optical module comprises:

a downward wideband light source for generating a downward light over a wide wavelength range;

an upward wideband light source for generating an upward light over a wide wavelength range;

a first circulator including a first to a third port for outputting the downward light inputted to the first port from the downward wideband light source to the second port and for outputting multiplexed downward optical signals inputted to the second port to the third port;

a second circulator including a first to a third port for outputting the upward light, inputted to the first port from the upward wideband light source to the second port and for outputting multiplexed upward optical signals inputted to the second port to the third port;

a first selective coupler disposed between the second port of the first circulator and the third port of the second circulator and coupled to the communication optical line;

a second selective coupler disposed between the third port of the first circulator and the second port of the second circulator and coupled to the communication optical line; and an optical coupler disposed along the communication optical line and coupled to the second selective coupler for partially dividing the multiplexed upward and downward optical signals inputted through the communication optical line.

* * * * *